United States Patent
Mao et al.

(10) Patent No.: US 9,816,029 B2
(45) Date of Patent: Nov. 14, 2017

(54) ORGANIC AMINE DECARBONIZATION SOLUTIONS

(71) Applicants: China Petroleum & Chemical Corporation, Beijing (CN); Research Institute of Nanjing Chemical Industrial Group, Nanjing (CN)

(72) Inventors: Songbai Mao, Nanjing (CN); Zhongbin Huang, Nanjing (CN)

(73) Assignees: CHINA PETROLEUM & CHEMICAL CORPORATION, Beijing (CN); RESEARCH INSTITUTE OF NANJING CHEMICAL INDUSTRIAL GROUP, Nanjing (CN)

( * ) Notice: Subject to any disclaimer, the term of this patent is extended or adjusted under 35 U.S.C. 154(b) by 321 days.

(21) Appl. No.: 14/307,940

(22) Filed: Jun. 18, 2014

(65) Prior Publication Data

US 2014/0367612 A1 Dec. 18, 2014

(30) Foreign Application Priority Data

Jun. 18, 2013 (CN) .......................... 2013 1 0240933

(51) Int. Cl.
| | |
|---|---|
| C09K 15/32 | (2006.01) |
| B01D 53/14 | (2006.01) |
| B01D 53/62 | (2006.01) |

(52) U.S. Cl.
CPC ........ *C09K 15/326* (2013.01); *B01D 53/1475* (2013.01); *B01D 53/1493* (2013.01); *B01D 2251/90* (2013.01); *B01D 2252/205* (2013.01); *B01D 2252/2041* (2013.01); *B01D 2252/20405* (2013.01); *B01D 2252/20421* (2013.01); *B01D 2252/20426* (2013.01); *B01D 2252/20431* (2013.01); *B01D 2252/20478* (2013.01); *B01D 2252/504* (2013.01); *B01D 2252/604* (2013.01); *B01D 2258/0283* (2013.01); *Y02C 10/04* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| | | | | |
|---|---|---|---|---|
| 3,896,044 A | * | 7/1975 | Mago .................... | C23F 11/06 252/189 |
| 3,959,170 A | * | 5/1976 | Mago .................... | C23F 11/06 252/189 |
| 4,143,119 A | * | 3/1979 | Asperger .............. | B01D 3/322 252/189 |
| 4,446,119 A | * | 5/1984 | DuPart ............... | B01D 53/1493 252/189 |
| 7,666,813 B2 | * | 2/2010 | Hoefer ............... | B01D 53/1493 423/229 |
| 2004/0253159 A1 | | 12/2004 | Hakka et al. | |
| 2005/0202967 A1 | * | 9/2005 | Hoefer ............... | B01D 53/1493 502/401 |
| 2009/0205496 A1 | | 8/2009 | Idem et al. | |
| 2012/0070353 A1 | | 3/2012 | Trukhan et al. | |
| 2012/0217437 A1 | | 8/2012 | Kondo et al. | |
| 2014/0127119 A1 | | 5/2014 | Fujimoto et al. | |

FOREIGN PATENT DOCUMENTS

| | | |
|---|---|---|
| CN | 1381301 A | 11/2002 |
| CN | 101053751 A | 10/2007 |
| CN | 10 612509 A | 12/2009 |
| CN | 101822932 A | 9/2010 |
| CN | 103394277 A | 11/2013 |
| JP | 3739437 B2 | 1/2006 |
| WO | WO 2011/036712 A1 | 3/2011 |
| WO | WO 2012/125894 A2 | 9/2012 |
| WO | 2014/073803 A1 | 5/2014 |

OTHER PUBLICATIONS

Search Report issued on Dec. 17, 2014, by the Intellectual Property of the United Kingdom in corresponding United Kingdom Patent Application No. GB1410691.8. (4 pages).

* cited by examiner

*Primary Examiner* — Joseph D Anthony
(74) *Attorney, Agent, or Firm* — Buchanan Ingersoll & Rooney PC

(57) ABSTRACT

An organic amine decarbonization solution includes: i) one or more organic amines serving as a carbon dioxide absorbent; and ii) an antioxidant. The antioxidant includes: a) one or more organometallic complexes of Formula $[M_x(L)_y]A_n$, wherein each M independently represents a central atom selected from the group consisting of transition metals, Group IVA metals and Group VA metals at a lower valence state; each L independently represents a bidentate or multidentate organic ligand with each ligating atom thereof being independently one of O, S, N and P; each A independently represents an uncoordinated counter-ion suitable for forming an outer sphere of a complex; x is 1, 2 or 3; y is 1, 2, 3, 4, 5, 6, 7 or 8; and n is 0, 1, 2, 3 or 4; and b) optionally one or more metal chelating agents.

19 Claims, No Drawings

ORGANIC AMINE DECARBONIZATION SOLUTIONS

FIELD OF THE INVENTION

The present invention relates generally to a gas separation and purification field, particularly to an organic amine decarbonization solution useful for capturing carbon dioxide from a source gas including a natural gas, a synthesis gas, a flue gas and the like, and more particularly to an organic amine decarbonization solution comprising an antioxidant.

BACKGROUND OF THE INVENTION

Severe environmental and climatic problems have occurred due to the greenhouse effect caused by a large-scale emission of carbon dioxide all over the world. Meanwhile, as a useful resource, carbon dioxide have been widely used in the fields of chemical engineering, oil recovery, foods, medicines and the like. Therefore, capturing $CO_2$ and then using it in associated fields can not only effectively mitigate climatic problems, but also bring a great economic benefit.

Currently, absorption processes using organic amine solutions are commonly used processes for $CO_2$ capture and recovery, and have been widely applied to natural gases, synthesis gases, flue gases and other source gases. Researchers are continuously working to develop effective absorption solutions in the following ways: 1) increasing the $CO_2$ absorption capacity; 2) improving the anti-corrosion and anti-degradation performances of the solvents; and 3) reducing the energy consumption and the environmental impact. In recent years, studies in countries over the world have made a great progress in the first and third ways. But, studies in the mitigation of oxidative degradation of organic amine solutions are very limited, which become the bottleneck of a further development of such processes.

Chinese Published Patent Application Nos. CN 101053751A, CN 101612509A and CN1381301A disclose the use of copper actate, sulfates, and some other metal oxides or salts as an antioxidant in absorption solutions. These antioxidants belong to oxygen-consuming reagents. In order to compensate the consumption of such antioxidants, a periodical supplementation of fresh antioxidants to the absorption system is required, which not only increases the operating cost, but also introduces impurity ions to the system. And, the accumulation of impurity ions may decrease the decarbonization capacity, i.e., the capacity for absorbing and capturing $CO_2$, of the absorption solution.

Chinese Published Patent Application No. CN 101822932A discloses the use of phenols, such as hydroquinone, p-hydroxyphenol and the like, as an antioxidant. However, such materials have disadvantages of being susceptible to deactivation at elevated temperatures, lack of environmental friendliness, etc.

Chinese Patent Application No. CN1381301A discloses the use of a solid metal oxide and salts thereof as an antioxidant, which shows a good anti-oxidative effect on an aqueous monoethanolamine solution and can greatly extend the working life of the solution. But, such an antioxidant is useful for only a few organic amines.

Japanese Patent No. JP3739437B2 discloses the use of imidazole-based organic sulfur compounds as an oxidation inhibitors for alkanolamines. Although such compounds can greatly inhibit oxidative degradation of alkanolamines, they themselves are also susceptible to oxidation in practical operation conditions in industry.

International Published Patent Application No. WO2011036712A1 discloses the use of a kind of sulfur-comprising amino acids for preventing the oxidation of alkanolamines. But, such materials are also oxygen-consuming oxidation inhibitors in nature.

US Published Patent Application No. US 2004/0253159 A1 discloses a composite antioxidant system comprising (hydro)sulfites, aromatic amines, metal chelating agents, and the like. International Published Patent. Application No. WO2012125894 A2 discloses a kind of antioxidants comprising one or more metal chelating agents, including 1-hydroxyethylidene-1,1-diphosphonic acid, diethylenetriamine pentaacetic acid, diethylenetriamine pentamethylene phosphonic acid, and the like, or salts thereof for capturing metal ions. In these two patent applications, the metal chelating agents are used to capture free metal ions, such as $Fe^{3+}$, $Cu^{2+}$, $Cr^{3+}$, $V^{5+}$ and $Ni^{2+}$, present in amine-based solvent systems, so as to inhibit the catalytic oxidation of amines in the presence of the metal ions, thereby greatly mitigating the oxidative degradation reactions of the amine solvents.

US Published Patent Application No. US2009205496A1 discloses a method for inhibiting $O_2$ or $SO_2$ induced amine degradation by using sodium sulfite, sodium potassium tartrate tetrahydrate, ethylenediaminetetraacetie acid, hydroxylamines, and the like, or mixtures thereof, which is reported to show a good inhibitive effect on the degradation.

Till now, most existing antioxidants have the disadvantages of poor anti-oxidative effect, high consumption and/or limited suitability for only a few organic amine systems, etc. A few patent applications, such as US2004/0253159A1 and US2009205496A1, have proposed composite systems comprising chelating agents and sulfites, but sulfites used in such composite systems tend to form $SO_4^{2-}$ in organic amine systems. And, stable salts thus formed may not only increase the boiling point of the decarbonization solution, thereby increasing energy consumption, but also cause a corrosion effect on pipelines and apparatus. International Published Patent Application No. WO2012/125894A2 is directed to the use of metal chelating agents alone as an antioxidant, of which the anti-oxidative mechanism is simplex and the overall anti-oxidative effect is limited and needs to be further improved. In view of the above, there remains a need for antioxidants or antioxidant systems for organic amine decarbonization solutions, showing wide suitability and good anti-oxidative effects.

All references mentioned in the present application, including but not limited to patents and published patent applications, are incorporated herein by reference to the extent of not conflicting with the present application.

SUMMARY OF THE INVENTION

An object of the present invention is to provide a solution for the problem associated with the susceptibility of organic amine decarbonization solutions to oxidative degradation, which can be applied to various mono-component or multi-component organic amine systems while providing excellent anti-oxidative effects.

In a first aspect, the present invention provides an organic amine decarbonization solution, comprising:
i) one or more organic amines serving as a carbon dioxide absorbent; and
ii) an antioxidant, which comprises:
a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;

each L independently represents a bidentate or multidentate organic ligand with each ligating atom thereof being independently one of O, S, N and P;

each A independently represents an uncoordinated counter-ion suitable for forming an outer sphere of a complex;

x is 1, 2 or 3;

y is 1, 2, 3, 4, 5, 6, 7 or 8; and n is 0, 1, 2, 3 or 4; and b) optionally one or more metal chelating agents.

In a second aspect, the present invention provides a method for mitigating oxidative degradation of an organic amine decarbonization solution, comprising adding to the organic amine decarbonization solution an effective amount of an antioxidant, which comprises:

a) one or more organometallic complexes having the following Formula (I):

$$[M_x(L)_y]A_n \quad (I)$$

wherein:

each M independently represents a central atom selected from the group consisting of transition metals, Group IVA metals and Group VA metals at a lower valence state;

each L independently represents a bidentate or multidentate organic ligand with each ligating atom thereof being independently one of O, S, N and P;

each A independently represents an uncoordinated counter-ion suitable for forming an outer sphere of a complex;

x is 1,2 or 3;

y is 1, 2, 3, 4, 5, 6, 7 or 8; and n is 0, 1, 2, 3 or 4; and b) optionally one or more metal chelating agents.

In a third aspect, the present invention provides an antioxidant composition, comprising:

a) one or more organometallic complexes having the following Formula (I):

$$[M_x(L)_y]A_n \quad (I)$$

wherein:

each M independently represents a central atom selected from the group consisting of transition metals, Group IVA metals and Group VA metals at a lower valence state;

each L independently represents a bidentate or multidentate organic ligand with each ligating atom thereof being independently one of O, S, N and P;

each A independently represents an uncoordinated counter-ion suitable for forming an outer sphere of a complex;

x is 1, 2 or 3;

y is 1, 2, 3, 4, 5, 6, 7 or 8; and n is 0, 1, 2, 3 or 4; and b) one or more metal chelating agents.

In a fourth aspect, the present invention provides the use of the antioxidant composition of the present invention for mitigating oxidative degradation of an organic amine decarbonization solution.

The present invention provides the advantages of effectively mitigating oxidative degradation of organic amine decarbonization solutions, and wide suitability for a number of organic amine decarbonization solutions. Moreover, when a combination of the organometallic complex and the metal chelating agent is used, a further improved antioxidative effect can be achieved, and one or more of the following benefits can be realized: an increase of $CO_2$ absorption rate and capacity; a reduction of dirt like iron mud and thus an improvement of the operating efficiency of devices; and a reduction of the corrosion rate of pipelines and apparatus. Furthermore, the present invention can take effect with a relative small amount of the antioxidant, and thus a reduced environmental contamination will be made, if any.

DETAILED DESCRIPTION OF THE INVENTION

As used herein, the term "decarbonization solution" refers to an liquid reagent useful for absorbing and/or capturing $CO_2$ physically and/or chemically from a source gas including, but not limited to, a natural gas, a synthesis gas, a flue gas, and the like, such as a coal-burned flue gas, a refinery gas and various chemical engineering exhaust gases. Generally, in the source gas, the content of $CO_2$ is about 5% to about 20% by volume, and the content of $O_2$ is about 0% to about 15% by volume.

As used herein, the term "organic amine decarbonization solution" refers to a decarbonization solution comprising an organic amine(s) as a main $CO_2$ absorbent, which may further comprise an auxiliary absorbent, an activator, a corrosion inhibitor, an antioxidant and/or a solvent if required. In practice, depending on the intended application and the working environment, the organic amine decarbonization solution may also contain free metal ions including, but not limited to, one or more of $Fe^{3+}$, $Cu^{2+}$, $V^{5+}$, $Ni^{2+}$, $Zn^{2+}$ and $Cr^{3+}$. These metal ions may be introduced by various additives, such as corrosion inhibitors, or be introduced by a corrosion of storage tanks, pipelines and other apparatus made of metal. In certain embodiments, the total content of the free metal ions is above about 30 ppm.

As used herein, the term "outer sphere" of a complex has the meaning commonly known in the art. For example, it may refer to a constituent part, that may be present or absent in a complex, constituted by any species involved in the complex other than its central atom(s) and ligand(s). If present, this constituent part can be disassociated relatively more easily from the complex. It can be understood that if a complex is constituted only by a central atom(s) and a ligand(s), the complex will have no outer sphere.

In a first aspect of the present invention, it is provided an organic amine decarbonization solution, comprising:

i) one or more organic amines serving as a carbon dioxide absorbent; and ii) an antioxidant, which comprises:

a) one or more organometallic complexes having the following Formula (I):

$$[M_x(L)_y]A_n \quad (I)$$

wherein:

each M independently represents a central atom selected from the group consisting of transition metals, Group IVA metals and Group VA metals at a lower valence state;

each L independently represents a bidentate or multidentate organic ligand with each ligating atom thereof being independently one of O, S, N and P;

each A independently represents an uncoordinated counter-ion suitable for forming an outer sphere of a complex;

x is 1, 2 or 3;

y is 1, 2, 3, 4, 5, 6, 7 or 8; and n is 0, 1, 2, 3 or 4; and b) optionally one or more metal chelating agents.

In certain embodiments, the x in Formula (I) may be any of 1, 2, and 3, and preferably be 1 or 2.

In certain embodiments, the y in Formula (I) may be any of 1, 2, 3, 4, 5, 6, 7 and 8, preferably be 1, 2, 4 or 6, more preferably be 2 or 4, and most preferably be 2.

In certain embodiments, the n in Formula (I) may be any of 0, 1, 2, 3 and 4, preferably be 0, 2, 3 or 4, more preferably be 0, 2 or 3, and most preferably be 2 or 3.

In some preferred embodiments, the antioxidant is substantially consisting of the organometallic complex(es) and the optional metal chelating agent(s).

In the organic amine decarbonization solution of the present invention, the component metal of the central atom M of the organometallic complex is at a lower valence state, i.e. a valence state, such as 0, +1, +2, +3 or +4, lower than the highest valence state of the metal that can be reached. It can be appreciated that the component metal may be in the form of a metal atom or a metal ion. At such a valence state, the central atom M is reductive and thus can be oxidized to a higher valence state. Without being bound to any specific theory, it is believed that the central atom at a lower valence state may capture oxygen radicals, thereby inhibiting a segment of the reaction chain for the oxidative degradation of the organic amine, such as inhibiting the formation of a intermediate product formed during the oxidative degradation of the organic amine, and thus an inhibitive effect on the oxidative degradation can be achieved.

Metals suitable as the central atom M of the organometallic complex according to the present invention include transition metals, Group IVA metals and Group VA metals. Specific examples include, but are not limited to, Cr, Mo, Ti, Sb, Fe, Mn, V, Co, Bi, Sn and Cu. Preferred metal(s) is one or more selected from the group consisting of Cr, Sb, Fe, Sn, Mn and Bi, and more preferably one or more of Sb and Bi.

Ligands suitable as the organic ligand L of the organometallic complex according to the present invention include bidentate and multidentate organic ligands, of which each ligating atom is independently selected from the group consisting of O, S, N and P. Specific examples include, but not limited to, tartrate, gallate, gluconate, oxalate, ethylenediaminetetraacetate, citrate and phytate. Preferred ligand(s) is one or more selected from the group consisting of tartrate, gallate, oxalate, citrate and ethylenediaminetetraacetate, and more preferably one or more of tartrate and citrate.

In the organometallic complex according to the present invention, the uncoordinated counter-ion A may be present, in which case n equals to any of 1 to 4; or may be absent, in which case n equals to 0. If present, there is no specific limitation to the ion A, i.e. the ion A can be any ion suitable for forming an outer sphere of a complex. In other words, any ion can be used in the present invention as the uncoordinated counter-ion A, as long as it can form a complex with the central atom M and the ligand L as described above. Specific examples include, but not limited to, potassium ion, sodium ion and ammonium ion.

As exemplified examples, organometallic complexes suitable for use in the present invention include, but not limited to, antimony sodium tartrate, bismuth potassium citrate, potassium chromium oxalate, ferrous tartrate, stannous tartrate, bismuth gallate, antimony sodium subgallate, antimony potassium citrate, ethylenediaminetetraacetic acid manganese disodium salt and bismuth sodium ethylenediaminetetraacetate. Preferred organometallic complex(es) is selected from the group consisting of antimony sodium tartrate, bismuth potassium citrate and a combination thereof.

In certain embodiments, the metal chelating agent used in the present invention can act as a bidentate or multidentate ligand to form a stable metal complex, dissolvable in the decarbonization solution, with metal ions including, but not limited to, ions of Ca, Fe, Cu, Cr, Ni, V and the like, and preferably a metal complex remaining stable at a temperature up to about 160° C. More preferably, the metal chelating agent may serve as a Lewis base to provide a duplet, thereby increasing the $CO_2$ absorption rate to a certain degree.

The metal chelating agent used in the present invention is preferably an organic metal chelating agent, of which typical examples include, but not limited to, ethylenediaminetetraacetic acid, 1-hydroxyethylidene-1,1-diphosphonic acid, nitrilotriacetic acid, ethylenediamine tetramethylene phosphonic acid, diethylenetriamine pentaacetic acid, diethylene triamine pentamethylene phosphonic acid and 2-phosphonobutane-1,2,4-tricarboxylic acid. Most preferred metal chelating agent is 1-hydroxyethylidene-1,1-diphosphonic acid.

In some preferred embodiments of the present invention, the organometallic complex and the metal chelating agent are present in the antioxidant in a mass ratio of from about 1:5 to about 1:30, more preferably from about 1:5 to about 1:10, and further more preferably from about 1:5 to about 1:6.

In particularly preferred embodiments, the antioxidant comprises bismuth potassium citrate and/or antimony sodium tartrate as the organometallic complex(es) and 1-hydroxyethylidene-1,1-diphosphonic acid as the metal chelating agent. More preferably, the antioxidant is substantially consisted of bismuth potassium citrate and/or antimony sodium tartrate as the organometallic complex(es) and 1-hydroxyethylidene-1,1-diphosphonic acid as the metal chelating agent.

In the antioxidant according to the present invention, the organometallic complex(es) has a direct inhibitive effect on the oxidation of the organic amine decarbonization solution, and thus can be used alone to achieve an anti-oxidative effect. In some preferred embodiments, the organometallic complex(es) is present in an amount of from about 0.05% to about 5% by mass, preferably from about 0.1% to about 1% by mass, based on the total amount of the organic amine decarbonization solution.

In the antioxidant according to the present invention, when the organometallic complex(es) is used in combination with the metal chelating agent(s), a better anti-oxidative effect can be achieved. In some preferred embodiments, the organometallic complex(es) and the metal chelating agent(s) are present in a combined amount of from about 1% to about 15%, preferably from about 2% to about 10%, based on the total amount of the organic amine decarbonization solution.

Organic amine absorbents suitable for use in the present invention can be any organic amine conventionally used for $CO_2$ absorption, including, but not limited to, those disclosed in the patents and patent applications cited in the "Background of the Invention" section, such as monoethanolamine, methyldiethanolamine, isopropanolamine, N-(2-hydroxyethyl)ethylenediamine, 2-amino-2-methyl-1-propanol, and the like.

In certain embodiments, the organic amine decarbonization solution according to the present invention further comprises a solvent in which the organic amine(s) serving as the $CO_2$ absorbent, and the organometallic complex(es) and the metal chelating agent(s) (if any) serving as the antioxidant can be dissolved. Examples for suitable solvents include, but not limited to, water.

In a second aspect of the present invention, it is provided a method for mitigating oxidative degradation of an organic amine decarbonization solution, comprising adding to the organic amine decarbonization solution an effective amount of an antioxidant, comprising:
a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;
each L independently represents a bidentate or multidentate organic ligand with each ligating atom thereof being independently one of O, S, N and P;
each A independently represents an uncoordinated counter-ion suitable for forming an outer sphere of a complex;
x is 1, 2 or 3;
y is 1, 2, 3, 4, 5, 6, 7 or 8; and
n is 0, 1, 2, 3 or 4; and
b) optionally one or more metal chelating agents.

In certain preferred embodiments, the antioxidant is substantially consisted of the organometallic complex(es) and the optional metal chelating agent(s).

As used herein, the term "an effective amount" means an amount of the antioxidant effective to mitigate oxidative degradation of an organic amine decarbonization solution. In certain preferred embodiments, the antioxidant is added in such an amount that the organometallic complex(es) is present in amount of from about 0.05% to about 5% by mass, preferably from about 0.1% to about 1% by mass, based on the combined amount of the organic amine decarbonization solution and the antioxidant. In other preferred embodiments, the antioxidant is added in such an amount that the organometallic complex(es) and the metal chelating agent(s) are present in a combined amount of from about 1% to about 15% by mass, preferably from about 2% to about 10% by mass, based on the combined amount of the organic amine decarbonization solution and the antioxidant, in which the organometallic complex(es) and the metal chelating agent(s) are present in a mass ratio of from about 1:5 to about 1:30.

In a third aspect of the present invention, it is provided an antioxidant composition, comprising:
a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;
each L independently represents a bidentate or multidentate organic ligand with each ligating atom thereof being independently one of O, S, N and P;
each A independently represents an uncoordinated counter-ion suitable for forming an outer sphere of a complex;
x is 1, 2 or 3;
y is 1, 2, 3, 4, 5, 6, 7 or 8; and
n is 0, 1, 2, 3 or 4; and
b) one or more metal chelating agents.

In certain preferred embodiments, the antioxidant is substantially consisted of the organometallic complex(es) and the optional metal chelating agent(s).

In certain preferred embodiments, the organometallic complex(es) and the optional metal chelating agent(s) are present in the antioxidant composition in a mass ratio of from about 1:5 to about 1:30, preferably from about 1:5 to about 1:10, and more preferably from about 1:5 to about 1:6.

In particularly preferred embodiments, the antioxidant composition comprises bismuth potassium citrate and/or antimony sodium tartrate as the organometallic complex(es) and 1-hydroxyethylidene-1,1-diphosphonic acid as the metal chelating agent. More preferably, the antioxidant composition is substantially consisted of bismuth potassium citrate and/or antimony sodium tartrate as the organometallic complex(es) and 1-hydroxyethylidene-1,1-diphosphonic acid as the metal chelating agent.

In a fourth aspect of the present invention, it is provided the use of the antioxidant composition according to the present invention for mitigating oxidative degradation of an organic amine decarbonization solution.

In particular, the present invention provides technical solutions in the following aspects:
1. An organic amine decarbonization solution, comprising:
   i) one or more organic amines serving as a carbon dioxide absorbent; and
   ii) an antioxidant, which comprises:
   a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;
each L independently represents a bidentate or multidentate organic ligand with each ligating atom thereof being independently one of O, S, N and P;
each A independently represents an uncoordinated counter-ion suitable for forming an outer sphere of a complex, and preferably an ion selected from the group consisting of potassium ion, sodium ion and ammonium ion;
x is 1, 2 or 3, and preferably 1 or 2;
y is 1, 2, 3, 4, 5, 6, 7 or 8, preferably 1, 2, 4 or 6, more preferably 2 or 4, and most preferably 2; and
n is 0, 1, 2, 3 or 4, preferably 0, 2, 3 or 4, more preferably 0, 2 or 3, and more preferably 2 or 3; and
b) optionally one or more metal chelating agents.

2. The organic amine decarbonization solution according to aspect 1, wherein each M in Formula (I) is independently selected from the group consisting of Cr, Mo, Ti, Sb, Fe, Sn, Mn, V, Co, Bi and Cu, preferably selected from the group consisting of Cr, Sb, Fe, Sn, Mn and Bi, and more preferably selected from the group consisting of Sb and Bi.

3. The organic amine decarbonization solution according to any one of aspects 1-2, wherein each L in Formula (I) is independently selected from the group consisting of tartrate, gallate, gluconate, oxalate, ethylenediaminetetraacetate, citrate and phytate, preferably selected from the group consisting of tartrate, gallate, oxalate, citrate and ethylenediaminetetraacetate, and more preferably selected from the group consisting of tartrate and citrate.

4. The organic amine decarbonization solution according to any one of aspects 1-3, wherein the organometallic complex(es) is selected from the group consisting of antimony sodium tartrate, bismuth potassium citrate, potassium chromium oxalate, ferrous tartrate, stannous tartrate, bismuth gallate, antimony sodium subgallate, antimony potassium citrate, ethylenediaminetetraacetic acid manganese di sodium salt, bismuth sodium ethylenediaminetetraacetate and combinations thereof, and preferably selected from the group consisting of antimony sodium tartrate, bismuth potassium citrate and a combination thereof.

5. The organic amine decarbonization solution according to any one of aspects 1-4, wherein the metal chelating agent(s) is an organic metal chelating agent, and is preferably selected from the group consisting of ethylenediaminetetraacetic acid, 1-hydroxyethylidene-1,1-diphosphonic acid, nitrilotriacetic acid, ethylenediamine tetramethylene phosphonic acid, diethylenetriamine pentaacetic acid, diethylenetriamine pentamethylene phosphonic acid, 2-phosphonobutane-1,2,4-tricarboxylic acid, and combinations thereof, and is more preferably 1-hydroxyethylidene-1,1-diphosphonic acid.

6. The organic amine decarbonization solution according to any one of aspects 1-5, wherein the organometallic complex(es) and the metal chelating agent(s) are present in a mass ratio of from about 1:5 to about 1:30, preferably from about 1:5 to about 1:10, and more preferably from about 1:5 to about 1:6.

7. The organic amine decarbonization solution according to any one of aspects 1-6, wherein the organic amine(s) is selected from the group consisting of monoethanolamine, N-(2-hydroxyethyl)ethylenediamine, monoisopropanolamine, 2-amino-2-methyl-1-propanol, N-methyldiethanolamine, and combinations thereof.

8. The organic amine decarbonization solution according to any one of aspects 1-7, wherein the organometallic complex(es) is present in an amount of from about 0.05% to about 5% by mass, preferably from about 0.1% to about 1% by mass, based on the total amount of the organic amine decarbonization solution.

9. The organic amine decarbonization solution according to any one of aspects 1-8, wherein the organometallic complex(es) and the metal chelating agent(s) are present in a combined amount of from about 1% to about 15% by mass, preferably from about 2% to about 10% by mass, based on the total amount of the organic amine decarbonization solution.

10. A method for mitigating oxidative degradation of an organic amine decarbonization solution, comprising adding to the organic amine decarbonization solution an effective amount of an antioxidant, which comprises:
   a) one or more organometallic complexes having the following Formula (I):

wherein:
   each M independently represents a central atom selected from the group consisting of transition metals, Group IVA metals and Group VA metals at a lower valence state;
   each L independently represents a bidentate or multidentate organic ligand with each ligating atom thereof being independently one of O, S, N and P;
   each A independently represents an uncoordinated counter-ion suitable for forming an outer sphere of a complex, and preferably an ion selected from the group consisting of potassium ion, sodium ion and ammonium ion;
   x is 1, 2 or 3, and preferably 1 or 2;
   y is 1, 2, 3, 4, 5, 6, 7 or 8, preferably 1, 2, 4 or 6, more preferably 2 or 4, and most preferably 2; and
   n is 0, 1, 2, 3 or 4, preferably 0, 2, 3 or 4, more preferably 0, 2 or 3, and more preferably 2 or 3; and
   b) optionally one or more metal chelating agents.

11. The method according to aspect 10, wherein the antioxidant is added in such an amount that the organometallic complex(es) is present in an amount of from about 0.05% to about 5% by mass, preferably from about 0.1% to about 1% by mass, based on the combined amount of the organic amine decarbonization solution and the antioxidant.

12. The method according to aspect 10 or 11, wherein the antioxidant is added in such an amount that the organometallic complex(es) and the metal chelating agent(s) are present in an amount from about 1% to about 15% by mass, preferably from about 2% to about 10% by mass, based on the combined amount of the organic amine decarbonization solution and the antioxidant.

13. The method according to aspect 12, wherein the organometallic complex(es) and the metal chelating agent(s) are present in a mass ratio of from about 1:5 to about 1:30, preferably from about 1:5 to about 1:10, and more preferably from about 1:5 to about 1:6.

14. An antioxidant composition, comprising:
   a) one or more organometallic complexes having the following Formula (I):

wherein:
   each M independently represents a central atom selected from the group consisting of transition metals, Group IVA metals and Group VA metals at a lower valence state;
   each L independently represents a bidentate or multidentate organic ligand with each ligating atom thereof being independently one of O, S, N and P;
   each A independently represents an uncoordinated counter-ion suitable for forming an outer sphere of a complex, and preferably an ion selected from the group consisting of potassium ion, sodium ion and ammonium ion;
   x is 1, 2 or 3, and preferably 1 or 2;
   y is 1, 2, 3, 4, 5, 6, 7 or 8, preferably 1, 2, 4 or 6, more preferably 2 or 4, and most preferably 2; and
   n is 0, 1, 2, 3 or 4, preferably 0, 2, 3 or 4, more preferably 0, 2 or 3, and more preferably 2 or 3; and
   b) one or more metal chelating agents.

15. The antioxidant composition according to aspect 14, wherein the organometallic complex(es) and the metal chelating agent(s) are present in a mass ratio of from about 1:5 to about 1:30, preferably from about 1:5 to about 1:10, and more preferably from about 1:5 to about 1:6.

16. The use of an antioxidant composition according to any one of aspects 14-15 for mitigating oxidative degradation of an organic amine decarbonization solution.

The characteristics of the present invention will be further described in the following examples by way of illustration, which should not be construed as a limitation to the scope of the present invention.

COMPARATIVE EXAMPLE 1

Marked as 1#

In this comparative example, an organic amine solution comprising 40 g of monoethanolamine, 160 g of deionized water, 0.5 g of sodium metavanadate and 0.1 g of ferric nitrate (hereinafter referred to as 1# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The time when the pressure began to decrease, indicating that the degradation reaction was started, was recorded as an initial degradation time, which was used hereinafter as an indicator for evaluating the performance of an antioxidant. The result is reported in Table 1.

EXAMPLE 1

Marked as 1#+MS

An experiment was conducted in the same maimer as described in Comparative Example 1, except that an antioxidant consisting of 0.4 g of bismuth potassium citrate was added to the 1# Decarbonization Solution as described above. The initial degradation time was recorded. And, the result is reported in Table 2.

EXAMPLE 1.1

Marked as 1.1#+MS

An experiment was conducted in the same manner as described in Comparative Example 1, except that an antioxidant consisting of 2 g of 1-hydroxyethylidene-1,1-diphosphonic acid and 0.4 g of bismuth potassium citrate was added to the 1# Decarbonization Solution as described above. The initial degradation time was recorded. And, the result is reported in Table 2.

COMPARATIVE EXAMPLE 2

Marked as 2#

In this comparative example, an organic amine solution comprising 40 g of N-methyldiethanolamine, 160 g of deionized water, 0.5 g of sodium metavanadate and 0.1 g of ferric nitrate (hereinafter referred to as 2# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 2

Marked as 2#+MS

An experiment was conducted in the same manner as described in Comparative Example 2, except that an antioxidant consisting of 0.4 g of bismuth potassium citrate was added to the 2# Decarbonization Solution as described above. The initial degradation time was recorded. And, the result is reported in Table 2.

EXAMPLE 2.1

Marked as 2.1#+MS

An experiment was conducted in the same manner as described in Comparative Example 2, except that an antioxidant consisting of 2 g of 1-hydroxyethylidene-1,1-diphosphonic acid and 0.4 g of bismuth potassium citrate was added to the 2# Decarbonization Solution as described above. The initial degradation time was recorded. And, the result is reported in Table 2.

COMPARATIVE EXAMPLE 3

Marked as 3#

In this comparative example, an organic amine solution comprising 40 g of monoisopropanolamine, 160 g of deionized water, 0.5 g of sodium metavanadate and 0.1 g of ferric nitrate (hereinafter referred to as 3# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 3

Marked as 3#+MS

An experiment was conducted in the same manner as described in Comparative Example 3, except that an antioxidant consisting of 0.4 g of bismuth potassium citrate was added to the 3# Decarbonization Solution as described above. The initial degradation time was recorded. And, the result is reported in Table 2.

EXAMPLE 3.1

Marked as 3.1#+MS

An experiment was conducted in the same manner as described in Comparative Example 3, except that an antioxidant consisting of 2 g of 1-hydroxyethylidene-1,1-diphosphonic acid and 0.4 g of bismuth potassium citrate was added to the 3# Decarbonization Solution as described above. The initial degradation time was recorded. And, the result is reported in Table 2.

COMPARATIVE EXAMPLE 4

Marked as 4#

In this comparative example, an organic amine solution comprising 40 g of N-(2-hydroxyethyl)ethylenediamine, 160 g of deionized water, 0.5 g of sodium metavanadate and 0.1 g of ferric nitrate (hereinafter referred to as 4# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 4

Marked as 4#+MS

An experiment was conducted in the same manner as described in Comparative Example 4, except that an antioxidant consisting of 0.4 g of bismuth potassium citrate was added to the 4# Decarbonization Solution as described above. The initial degradation time was recorded. And, the result is reported in Table 2.

EXAMPLE 4.1

Marked as 4.1#+MS

An experiment was conducted in the same manner as described in Comparative Example 4, except that an antioxidant consisting of 2 g of 1-hydroxyethylidene-1,1-diphosphonic acid and 0.4 g of bismuth potassium citrate was added to the 4# Decarbonization Solution as described above. The initial degradation time was recorded. And, the result is reported in Table 2.

COMPARATIVE EXAMPLE 5

Marked as 5#

In this comparative example, an organic amine solution comprising 20 g of monoethanolamine, 20 g of N-methyldiethanolamine, 160 g of deionized water, 0.5 g of sodium metavanadate and 0.1 g of ferric nitrate (hereinafter referred to as 5# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 5

Marked as 5#+MS

An experiment was conducted in the same manner as described in Comparative Example 5, except that an antioxidant consisting of 0.4 g of bismuth potassium citrate was added to the 5# Decarbonization Solution as described above. The initial degradation time was recorded. And, the result is reported in Table 2.

EXAMPLE 5.1

Marked as 5.1#+MS

An experiment was conducted in the same manner as described in Comparative Example 5, except that an antioxidant consisting of 2 g of 1-hydroxyethylidene-1,1-diphosphonic acid and 0.4 g of bismuth potassium citrate was added to the 5# Decarbonization Solution as described above. The initial degradation time was recorded. And, the result is reported in Table 2.

COMPARATIVE EXAMPLE 6

Marked as 6#

In this comparative example, an organic amine solution comprising 20 g of monoethanolamine, 20 g of monoisopropanolamine, 160 g of deionized water, 0.5 g of sodium metavanadate and 0.1 g of ferric nitrate (hereinafter referred to as 6# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 6

Marked as 6#+MS

An experiment was conducted in the same manner as described in Comparative Example 6, except that an antioxidant consisting of 0.4 g of bismuth potassium citrate was added to the 6# Decarbonization Solution as described above. The initial degradation time was recorded. And, the result is reported in Table 2.

EXAMPLE 6.1

Marked as 6.1#+MS

An experiment was conducted in the same manner as described in Comparative Example 6, except that an antioxidant consisting of 2 g of 1-hydroxyethylidene-1,1-diphosphonic acid and 0.4 g of bismuth potassium citrate was added to the 6# Decarbonization Solution as described above. The initial degradation time was recorded. And, the result is reported in Table 2.

COMPARATIVE EXAMPLE 7

Marked as 7#

In this comparative example, an organic amine solution comprising 20 g of monoethanolamine, 20 g of N-(2-hydroxyethyl)ethylenediamine, 160 g of deionized water, 0.5 g of sodium metavanadate and 0.1 g of ferric nitrate (hereinafter referred to as 7# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 7

Marked as 7#+MS

An experiment was conducted in the same manner as described in Comparative Example 7, except that an antioxidant consisting of 0.4 g of bismuth potassium citrate was added to the 7# Decarbonization Solution as described above. The initial degradation time was recorded. And, the result is reported in Table 2.

EXAMPLE 7.1

Marked as 7.1#+MS

An experiment was conducted in the same manner as described in Comparative Example 7, except that an antioxidant consisting of 2 g of 1-hydroxyethylidenc-1,1-diphosphonic acid and 0.4 g of bismuth potassium citrate was added to the 7# Decarbonization Solution as described above. The initial degradation time was recorded. And, the result is reported in Table 2.

COMPARATIVE EXAMPLE 8

Marked as 8#

In this comparative example, an organic amine solution comprising 10 g of monoethanolamine, 10 g of monoisopropanolamine, 10 g of N-methyldiethanolamine, 10 g of N-(2-hydroxyethyl)ethylenediamine, 160 g of deionized water, 0.5 g of sodium metavanadate and 0.1 g of ferric nitrate (hereinafter referred to as 8# Decarbonization Solution) was added into a 500 ml autoclave reactor and heated to 30° C. After that, 0.5 MPa of $CO_2$ was immediately charged into the reactor and stirred till it was completely absorbed. The resultant was further heated to a temperature of 120° C., and then $O_2$ was charged into the reactor until a pressure of 1.5 MPa was arrived. The reaction mixture was then stirred to initiate an enhanced degradation reaction. The initial degradation time was recorded. And, the result is reported in Table 1.

EXAMPLE 8

Marked as 8#+MS

An experiment was conducted in the same manner as described in Comparative Example 8, except that an antioxidant consisting of 0.4 g of bismuth potassium citrate was added to the 8# Decarbonization Solution as described above. The initial degradation time was recorded. And, the result is reported in Table 2.

EXAMPLE 8.1

Marked as 8.1#+MS

An experiment was conducted in the same manner as described in Comparative Example 8, except that an antioxidant consisting of 2 g of 1-hydroxyethylidene-1,1-diphosphonic acid and 0.4 g of bismuth potassium citrate was added to the 8# Decarbonization Solution as described above. The initial degradation time was recorded. And, the result is reported in Table 2.

EXAMPLE 9

Marked as 9#+MS

An experiment was conducted in the same manner as described in Comparative Example 1, except that an antioxidant consisting of 0.4 g of antimony sodium tartrate was added to the 1# Decarbonization Solution as described above. The initial degradation time was recorded. And, the result is reported in Table 2.

EXAMPLE 9.1

Marked as 9.1#+MS

An experiment was conducted in the same manner as described in Comparative Example 1, except that an antioxidant consisting of 2 g of 1-hydroxyethylidene-1,1-diphosphonic acid and 0.4 g of antimony sodium tartrate was added to the 1# Decarbonization Solution as described above. The initial degradation time was recorded. And, the result is reported in Table 2.

EXAMPLE 10

Marked as 10#+MS

An experiment was conducted in the same manner as described in Comparative Example 6, except that an antioxidant consisting of 0.4 g of antimony sodium tartrate was added to the 6# Decarbonization Solution as described above. The initial degradation time was recorded. And, the result is reported in Table 2.

EXAMPLE 10.1

Marked as 10.1#+MS

An experiment was conducted in the same manner as described in Comparative Example 6, except that an antioxidant consisting of 2 g of 1-hydroxyethylidene-1,1-diphosphonic acid and 0.4 g of antimony sodium tartrate was added to the 6# Decarbonization Solution as described above. The initial degradation time was recorded. And, the result is reported in Table 2.

EXAMPLE 11

Marked as 11#+MS

An experiment was conducted in the same manner as described in Comparative Example 7, except that an antioxidant consisting of 0.4 g of antimony sodium tartrate was added to the 7# Decarbonization Solution as described above. The initial degradation time was recorded. And, the result is reported in Table 2.

EXAMPLE 11.1

Marked as 11.1#+MS

An experiment was conducted in the same manner as described in Comparative Example 7, except that an antioxidant consisting of 2 g of 1-hydroxyethylidene-1,1-diphosphonic acid and 0.4 g of antimony sodium tartrate was added to the 7# Decarbonization Solution as described above. The initial degradation time was recorded. And, the result is reported in Table 2.

TABLE 1

Results from the enhanced oxidative degradation experiments conducted on the decarbonization solutions as described in Comparative Examples 1-8

| | Comparative Examples | | | | | | | |
|---|---|---|---|---|---|---|---|---|
| | 1# | 2# | 3# | 4# | 5# | 6# | 7# | 8# |
| Initial degradation time/min | 27 | 17 | 24 | 16 | 15 | 25 | 16 | 13 |

TABLE 2

Results from the enhanced oxidative degradation experiments conducted on the decarbonization solutions as described in Examples 1-11.1

| Examples | Initial degradation time/min | Examples | Initial degradation time/min |
|---|---|---|---|
| 1# + MS | 269 | 1.1# + MS | 321 |
| 2# + MS | 206 | 2.1# + MS | 256 |
| 3# + MS | 250 | 3.1# + MS | 310 |
| 4# + MS | 239 | 4.1# + MS | 289 |
| 5# + MS | 199 | 5.1# + MS | 237 |
| 6# + MS | 257 | 6.1# + MS | 311 |
| 7# + MS | 193 | 7.1# + MS | 225 |
| 8# + MS | 178 | 8.1# + MS | 204 |
| 9# + MS | 264 | 9.1# + MS | 298 |
| 10# + MS | 254 | 10.1# + MS | 291 |
| 11# + MS | 225 | 11.1# + MS | 234 |

In the above Examples 1-11.1, the mitigative/inhibitive effect of the antioxidant according to the present invention on oxidative degradation of various organic amine decarbonization solution systems were evaluated. In Examples 1-11.1, monoethanolamine, N-(2-hydroxyethyl)ethylenediamine, monoisopropanolamine, N-methyldiethanolamine and the like were used in the 1# to 8# Decarbonization Solutions as a $CO_2$ absorbent, because these amine solvents are among most widely used solvents in industrial plants. Ferric nitrate was added in the decarbonization solutions to simulate ferric ions present in practical industrial plants, and sodium metavanadate was added because it is a conventional corrosion inhibitor commonly used in industry.

It is clear from Tables 1-2 that use of the organometallic complex according to the present invention alone can achieve a substantive anti-oxidative effect, and a combined use of the organometallic complex and the metal chelating agent can achieve a further improved anti-oxidative effect.

Although the present invention is described in details by way of illustration with reference to preferred embodiments and concrete examples, the present invention is not limited to those embodiments and examples. It should be understood by a person skilled in the art that various modifications and changes may be made to these embodiments and examples without departing from the spirit and scope of the present invention. All those modifications and changes and equivalents thereof also fall within the scope of the present invention.

The invention claimed is:

1. An organic amine decarbonization solution, comprising:
    i) one or more organic amines serving as a carbon dioxide absorbent; and
    ii) an antioxidant, which comprises:
        a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;
each L independently represents a bidentate or multidentate organic ligand with each ligating atom thereof being independently one of O, S, N and P;
each A independently represents an uncoordinated counter-ion suitable for forming an outer sphere of a complex;
x is 1, 2 or 3;
y is 1, 2, 3, 4, 5, 6, 7 or 8; and
n is 0, 1, 2, 3 or 4; and
        b) one or more metal chelating agents.

2. The organic amine decarbonization solution according to claim 1, wherein each M in Formula (I) is independently selected from the group consisting of Cr, Mo, Ti, Sb, Fe, Sn, Mn, V, Co, Bi and Cu.

3. The organic amine decarbonization solution according to claim 1, wherein each L in Formula (I) is independently selected from the group consisting of tartrate, gallate, gluconate, oxalate, ethylenediaminetetraacetate, citrate and phytate.

4. The organic amine decarbonization solution according to claim 1, wherein the organometallic complex is selected from the group consisting of antimony sodium tartrate, bismuth potassium citrate, potassium chromium oxalate, ferrous tartrate, stannous tartrate, bismuth gallate, antimony sodium subgallate, antimony potassium citrate, ethylenediaminetetraacetic acid manganese disodium salt, bismuth sodium ethylenediaminetetraacetate and combinations thereof.

5. The organic amine decarbonization solution according to claim 1, wherein the metal chelating agent is an organic metal chelating agent.

6. The organic amine decarbonization solution according to claim 1, wherein the organometallic complex and the metal chelating agent are present in a mass ratio of from about 1:5 to about 1:30.

7. The organic amine decarbonization solution according to claim 1, wherein the organic amine is selected from the group consisting of monoethanolamine, N-(2-hydroxyethyl)ethylenediamine, monoisopropanolamine, 2-amino-2-methyl-1-propanol and N-methyldiethanolamine.

8. The organic amine decarbonization solution according to claim 1, wherein the organometallic complex is present in an amount of from about 0.05% to about 5% by mass, based on a total amount of the organic amine decarbonization solution.

9. The organic amine decarbonization solution according to claim 1, wherein the organometallic complex and the metal chelating agent are present in a combined amount of from about 1% to about 15% by mass, based on a total amount of the organic amine decarbonization solution, and wherein the organometallic complex and the metal chelating agent are present in a mass ratio of from about 1:5 to about 1:30.

10. A method for mitigating oxidative degradation of an organic amine decarbonization solution, comprising adding to the organic amine decarbonization solution an effective amount of an antioxidant, the antioxidant comprising:

a) one or more organometallic complexes having the following Formula (I):

$$[M_x(L)_y]A_n \qquad (I)$$

wherein:
each M independently represents a central atom selected from the group consisting of transition metals, Group IVA metals and Group VA metals at a lower valence state;
each L independently represents a bidentate or multidentate organic ligand with each ligating atom thereof being independently one of O, S, N and P;
each A independently represents an uncoordinated counter-ion suitable for forming an outer sphere of a complex;
x is 1, 2 or 3;
y is 1, 2, 3, 4, 5, 6, 7 or 8; and
n is 0, 1, 2, 3 or 4; and
b) one or more metal chelating agents.

11. The method according to claim 10, wherein the antioxidant is added in such an amount that the organometallic complex is present in an amount of from about 0.05% to about 5% by mass, based on a combined amount of the organic amine decarbonization solution and the antioxidant.

12. The method according to claim 10, wherein the antioxidant is added in such an amount that the organometallic complex and the metal chelating agent are present in a combined amount of from about 1% to about 15% by mass, based on a combined amount of the organic amine decarbonization solution and the antioxidant, and wherein the organometallic complex and the metal chelating agent are present in a mass ratio of from about 1:5 to about 1:30.

13. The organic amine decarbonization solution according to claim 2, wherein each M in Formula (I) is independently selected from the group consisting of Cr, Sb, Fe, Sn, Mn and Bi.

14. The organic amine decarbonization solution according to claim 3, wherein each L in Formula (I) is independently selected from the group consisting of tartrate, gallate, oxalate, citrate and ethylenediaminetetraacetate.

15. The organic amine decarbonization solution according to claim 4, wherein the organometallic complex is selected from the group consisting of antimony sodium tartrate, bismuth potassium citrate and a combination thereof.

16. The organic amine decarbonization solution according to claim 5, wherein the organic metal chelating agent is selected from the group consisting of ethylenediaminetetraacetic acid, 1-hydroxyethylidene-1,1-diphosphonic acid, nitrilotriacetic acid, ethylenediamine tetramethylene phosphonic acid, diethylenetriamine pentaacetic acid, diethylenetriamine pentamethylene phosphonic acid, 2-phosphonobutane-1,2,4-tricarboxylic acid, and combinations thereof.

17. The organic amine decarbonization solution according to claim 6, wherein the organometallic complex and the metal chelating agent are present in a mass ratio of from about 1:5 to about 1:10.

18. The organic amine decarbonization solution according to claim 8, wherein the organometallic complex is present in an amount of from about 0.1% to about 1% by mass, based on the total amount of the organic amine decarbonization solution.

19. An organic amine decarbonization solution, comprising:
i) one or more organic amines serving as a carbon dioxide absorbent; and
ii) an antioxidant, which comprises:
a) one or more organometallic complexes selected from the group consisting of bismuth potassium citrate, potassium chromium oxalate, ferrous tartrate, bismuth gallate, ethylenediaminetetraacete acid manganese disodium salt, bismuth soldium ethylenediaminetetraacete and combinations thereof; and
b) optionally one or more metal chelating agents.

* * * * *